United States Patent
Ohshita et al.

(10) Patent No.: US 7,264,549 B2
(45) Date of Patent: Sep. 4, 2007

(54) JOINT BOOT

(75) Inventors: Takenori Ohshita, Osaka (JP); Eiichi Imazu, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 187 days.

(21) Appl. No.: 10/527,816

(22) PCT Filed: Nov. 24, 2004

(86) PCT No.: PCT/JP2004/017386

§ 371 (c)(1),
(2), (4) Date: Mar. 14, 2005

(87) PCT Pub. No.: WO2005/100813

PCT Pub. Date: Oct. 27, 2005

(65) Prior Publication Data

US 2006/0079337 A1    Apr. 13, 2006

(30) Foreign Application Priority Data

Mar. 31, 2004    (JP) .............................. 2004-102649

(51) Int. Cl.
 *F16D 3/84* (2006.01)
(52) U.S. Cl. ..................... 464/175; 277/636; 277/639
(58) Field of Classification Search ................ 464/111, 464/173, 175, 905; 277/636, 637, 639
See application file for complete search history.

(56) References Cited

U.S. PATENT DOCUMENTS

| 4,280,340 A | 7/1981 | Goguet |
| 5,529,538 A | 6/1996 | Schulz et al. |
| 6,089,574 A | 7/2000 | Sadr et al. |
| 6,471,595 B1 | 10/2002 | Neviani |
| 6,695,706 B2 * | 2/2004 | Furuta .......................... 464/175 |
| 2004/0056434 A1 | 3/2004 | Wolf et al. |

(Continued)

FOREIGN PATENT DOCUMENTS

EP    0 915 264 A2    5/1999

(Continued)

*Primary Examiner*—Greg Binda
(74) *Attorney, Agent, or Firm*—Westerman, Hattori, Daniels & Adrian, LLP.

(57) ABSTRACT

A joint boot, wherein sealing performance of a large-diameter attachment part to an outer casing is enhanced, includes a large-diameter attachment part 2, a small-diameter attachment part 4 and a bellows part 5. The large-diameter attachment part 2 is provided on its inner periphery with plural convex portions 7 and constructed to be capable of externally fitting in plural recessed portions 8 formed on the outer periphery of the outer casing 1. The large-diameter attachment part 2 and the bellows part are formed in separate bodies, and a fit cylinder part 6 is extended at one extremity of the bellows part 5. The convex portions 7 include each an inner wall portion 12 jutting radially inwardly in a curved form, an outer wall portion 11 in an arc form constituting part of the outer periphery surface of the large-diameter attachment part, a central strut wall 13A connecting both in the circumferential middles of both, and a pair of lateral strut walls 13B, 13B connecting the inner and outer wall portions on both sides of the central strut wall, thereby forming four relief holes 21A, 22A, 23A, 24A circumferentially juxtaposed on the convex portions.

8 Claims, 7 Drawing Sheets

U.S. PATENT DOCUMENTS

2005/0192107 A1* 9/2005 Toriumi et al. ............ 464/175

FOREIGN PATENT DOCUMENTS

| JP | 2-22463 | 2/1990 |
| JP | 9-96319 | 4/1997 |
| JP | 11-13883 | 1/1999 |
| JP | 2002-286048 | 10/2002 |
| JP | 2002-340013 | 11/2002 |
| JP | 2003-194093 | 7/2003 |
| JP | 2003-329059 | 11/2003 |
| JP | 2004-211849 A | 7/2004 |
| JP | 2004-211850 A | 7/2004 |
| JP | 2004-316694 A | 11/2004 |

* cited by examiner

JOINT BOOT

DESCRIPTION

1. Technical Field

This invention relates to a joint boot comprising a cylindrical large-diameter attachment part to be installed by external fitting on a mounting part of an outer casing, a small-diameter attachment part to be installed on a shaft, and a bellows part interlinking both, wherein the large-diameter attachment part is configured on its outer peripheral face in a circular form in cross-section and provided on its inner peripheral surface with a plurality of convex portions protruding radially inwardly in a circumferentially distributed manner so that a plurality of the convex portions can be fitted externally in a plurality of recessed portions formed on the mounting part of the outer casing.

2. Background Art

One of constant velocity joints coupled to a drive shaft or the like of automobiles is a tripod type constant velocity joint, which is freely displaceable in the axial direction and capable of transmitting the torque. This type of constant velocity joint is constructed, as shown in FIGS. 8 and 9, of three trunnions 131 with rollers protruding in the normal direction to the axis which are mounted on an input (or output) shaft 103 and an outer casing 101 connected to the end of an output (or input) shaft 140, the outer casing 101 being defined in its inner peripheral area with three grooves 134, on which the rollers 132 roll and which are disposed in the circumferential direction in a distributed manner. The reference numeral 133 designates a tripod.

The joint boot mentioned at the beginning is installed on the constant velocity joint like this and serves to prevent the ingress of dirt, dust or extraneous matter into the constant velocity joint side and to retain a grease around the constant velocity joint. The outer casing 101 is provided with a plurality of recessed portions 108 being radially reentrant in such a manner that they are circumferentially distributed, thereby reducing the weight of the casing. Corresponding to the recessed portions, a large-diameter attachment part 102 of the joint boot is provided on its inner periphery with a plurality of convex portions 107 projecting radially inwardly in a circumferentially distributed manner.

As for such joint boots, EP 0915264A and JP Patent Application Publication 2003-329059 A disclose joint boots that are in entirety integrally formed of a resin material. In these joint boots, the convex portions of the large-diameter attachment part are each formed with relief holes to prevent the production of sinks attributed to shrinkage after molding of the resin material. This is because in a case where the convex portions are solid, a subsidence occurs on a sealing face of them to the outer casing owing to the sinks, impairing the sealing capability.

Further in U.S. Pat. No. 5,529,538 and JP Patent Publication 55-60726 A there are disclosed so-called two-piece type joint boots, wherein the large-diameter attachment part is formed in a discrete body from the bellows part, the bellows part is provided at its one end with a fit cylinder part that is externally fitted on the large-diameter attachment part, and both are assembled together. Also in these joint boots, the construction that relief holes are provided in the convex portions of the large-diameter attachment part is disclosed.

[Patent Reference 1] EP 0915264 A2
[Patent Reference 2] JP Patent Publication 2003-329059 A
[Patent Reference 3] U.S. Pat. No. 5,529,638
[Patent Reference 4] JP Patent Publication 55-60726 A

DISCLOSURE OF THE INVENTION

Problems To Be Solved By The Invention

In each of the joint boots the entirety of which is formed integrally of a resin material as described in Patent Reference 1 and Patent Reference 2 above, a problem arises in that when a plurality of relief holes will be formed on the convex portions of the large-diameter attachment part, it is hard to mold them because of the presence of the bellows parts.

On the other hand, in cases where a plurality of relief holes are provided on the convex portions of the large-diameter attachment part in a separate body, as in Patent Reference 3 and Patent Reference 4, the foregoing problem of moldability as is the case with the integral one-piece body ascribed to the bellows part is solved. However, even with the large-diameter attachment part of the separate body, in cases where a plurality of relief holes will be provided on the convex portions it is not easy to reduce a variation in clamping force while ensuring its moldability. That is, when the plural relief holes are provided on the convex portion so as to be juxtaposed in the circumferential direction, a clamping force by a clamping band on its external periphery side is hard to be transferred evenly to the inner wall portions of the convex portions owing to the presence of the relief holes, which fact is responsible for a variation in clamping force in the circumferential direction. The more the number of the relief holes arranged circumferentially, namely, the more the number of strut walls mutually comparing the relief holes, the more is reduced such as variation in clamping force. When the number of the relief holes is increased, however, there arise the problems that the profile shape of a mold is complicated and cores for molding the relief holes are deformed by the injection pressure upon molding. Conversely, in the case where three relief holes are provided on each of the convex portions so as to support the inner peripheral wall portion by two strut walls as disclosed in Patent Reference 4 above, a middle area of the inner wall portion radially inwardly jutting most largely is not supported, so that the sealing function is impaired.

A first object of this invention is therefore to solve these problems and to reduce the variation in clamping force, in case where relief holes are provided at the convex portions of the large-diameter attachment part, while ensuring the moldability.

In cases where the entirety of the joint boot is formed integrally of a resin material as is the cases with Patent References 1 and 2 above, the hardness of the large-diameter attachment part is hard such that the faying capability (tight mating) of the large-diameter attachment part to the outer casing is not good, and hence there remains a room for improvement in the aspect of a sealing capability. In that case, it is conceivable to form the large-diameter attachment part as a separate body from the bellows part and to mold it of a softer material than the bellow part, but yet by that approach alone it is unable to enhance the faying capability of the large-diameter attachment part to the outer casing while securing the external mounting function.

Accordingly, a second object of this invention is to provide a joint boot that is enhanced in the faying capability of the large-diameter attachment part to the outer casing thus enabling the sealing capability to be improved and also enhanced in external fitting and mounting function of the large-diameter attachment part to the outer casing.

Solution Means Of The Problems

A first joint boot of the invention solving the above-mentioned first object is directed to a joint boot which comprises a cylindrical large-diameter attachment part to be installed by external fitting to a mounting part of an outer casing, a small-diameter attachment part to be installed on a shaft, and a bellows part interlinking both; the large-diameter attachment part assuming on its external peripheral surface a circular form in cross-section and being formed on its internal peripheral surface with a plurality of convex portions protruding radially inwardly disposed in a distributed manner in the circumferential direction, a plurality of the convex portions of the large-diameter attachment part being constructed so that they can be externally fitted respectively in a plurality of recessed portions formed on the mounting part of the outer casing, wherein the large-diameter attachment part is formed in a separate body from the bellows part, and a fit cylinder part externally fitting on the large-diameter attachment part is provided to be extended to one end of the bellows part. And in the large-diameter attachment part, each of the convex portions includes an inner wall portion radially inwardly jutting in a curved form and adapted to be fitted in each recessed portion, an arc-form outer wall portion constituting part of an external peripheral surface of the large-diameter attachment part, a central strut wall linking both the inner wall portion and the outer wall portion in the circumferential middles of the both and extending radially, and a pair of lateral strut walls linking both the inner wall portion and the outer wall portion on both sides of the central strut wall, whereby four relief holes are juxtaposed in the circumferential direction on the each convex portion.

The large-diameter attachment part thus provided with the relief holes is formed in a separate body from the bellows part and hence, it is possible to conduct the removal of the mold upon molding the relief holes without obstruction by the bellows part. Further because the inner wall portion of the convex portion is supported by three strut walls including the central strut wall located in the middle thereof in the circumferential direction, and lateral strut walls on both sides of the central strut wall, for instance when the large-diameter attachment part is tightened and fixed to the outer casing by means of a clamping band, it is possible to reduce most effectively the variation in clamping force. More specifically, the aforesaid three strut walls when disposed equidistantly in the circumferential direction make it possible to support the central area of the inner wall portion, which juts radially inwardly most largely, with the central strut wall and simultaneously to dispose the lateral strut walls so that the clamping force may be equalized also on both sides of the central strut wall to the utmost. Further with the three strut walls, a relatively simple construction for the geometry of the mold will do and besides it is possible to ensure some degree of cross-sectional area of cores for molding the relief holes thereby suppressing the deformation due to injection pressure. Therefore, it is possible, while securing the moldability, to reduce the variation in clamping force to render the facial pressure of the inner wall portions exerted on the outer casing uniform in the circumferential direction to the utmost thereby enhancing the seating capability.

In the aforesaid first joint boot, when the lateral strut walls slant in such a manner that as they extend outwardly, they become close to the central strut wall, the demolding capability of the cores for molding the relief holes can be ensured. Further it is possible to connect the lateral strut walls supporting an outside face of the inner wall portion at a nearly vertical angle to the inner wall portion and hence it is possible to make the facial pressure of the inner wall portion to the outer casing more uniform in the circumferential direction.

In the foregoing first joint boot, in a case where the relief holes of each of the convex portions include four first relief holes apertured on the one edge face side of the large-diameter attachment part and juxtaposed in the circumferential direction and four second relief holes apertured on the other edge face side and juxtaposed in the circumferential direction, and there is formed a third strut wall that supports the inner wall portion by a wall part dividing between the first relief holes and the second relief holes and extends in the circumferential direction, the following operation is achieved:

That is, it is possible to support the inner wall portions of the convex portions over the circumferential entirety thereof by the third strut wall formed between the first relief holes and the second relief holes and consequently, it is possible to enhance the sealing capability in the circumferential direction without making the wall thickness of the inner wall portions of the convex portions thick. For example, with such a structure that only the relief holes opening on the one edge surface side of the large-diameter attachment part are formed, but no relief holes are formed on the other edge surface side, the amount of material corresponding to the other edge surface side is more than that corresponding to the one edge surface side, and the cooling speed of the material corresponding to the other edge surface side is slower than the cooling speed of the material corresponding to the one edge surface side, so that there is the failure (inconvenience) that a strain is liable to be produced on the convex portions after cooling. To the contrary, according to the construction above of this invention, because of the provision of the relief holes opening on both axial edge surfaces of the large-diameter attachment part, it is possible to make it difficult that the aforesaid both cooling speeds are significantly differentiated and to avoid the aforesaid failure.

In the first joint boot described above, in cases where the wall thickness of the third strut wall is preset to be larger than the wall thickness of a first central strut wall comparting the first relief holes and the lateral strut walls, the wall thickness of a second central strut wall comparting the second relief holes and the lateral strut walls, the wall thickness of the inner wall portions, and the wall thickness of peripheral walls of the large-diameter attachment part located between circumferentially adjacent convex portions, for example, when the large-diameter attachment part is tightened and fixed to the outer casing by means of a clamping band, it is possible to transfer the clamping force more reliably to the inner wall portions and to further improve the sealing capability.

A second joint boot solving the second object of this invention is directed to a joint boot which comprises a cylindrical large-diameter attachment part to be installed by external fitting on a mounting part of an outer casing, a small-diameter attachment part adapted to be installed to a shaft, and a bellows part interlinking both; the large-diameter attachment part assuming on its external peripheral surface a circular form in cross-section and being formed on its internal peripheral surface with a plurality of convex portions protruding radially inwardly in a distributed manner in the circumferential direction, a plurality of the convex portions of the large-diameter attachment part being constructed so that they can be externally fitted respectively in a plurality of recessed portions formed on the mounting part of the outer casing, wherein the bellows part is made of a resin material, the large-diameter attachment part is formed of a softer resin material than the bellows part or rubber material in a separate body from the bellows part, and a fit cylindrical part externally fitting on the large-diameter attachment part is extended to the one end of the bellows part. And, the large-diameter attachment part is formed, over the whole circumference of its internal peripheral surface, with a faying inner periphery portion smaller in diameter than the mounting part of the outer casing so that the large-diameter attachment part can fay and externally fit the mounting part; and concurrently, at the one end of the large-diameter attachment part opposite to the bellows part, an upset inner periphery portion assuming a straight hole larger in diameter than the mounting part and guiding the mounting part when the large-diameter attachment part is externally fitted on the mounting part is formed, over the whole circumference of the internal peripheral surface thereof, the upset inner periphery portion ending so as not to extend in the axial direction of the large-diameter attachment part up to the external fitting area by the fit cylinder part.

According to this construction, because the large-diameter attachment part is formed in a separate body from the bellows part and the bellows part is made of a resin material, it is possible to enhance the durability of the bellows part. Further the fit cylinder part externally fitting the large-diameter attachment part is extended at one extremity of the bellows part, and hence it is possible to securely assemble the large-diameter attachment part to the fit cylinder part. Furthermore because the large-diameter attachment part is formed of a softer resin material than the bellows part or rubber material, and the large-diameter attachment part is provided on the whole circumference of the inner peripheral surface of the faying inner periphery portion having a smaller diameter than the mounting part of the outer casing thereby constructing the large-diameter attachment part so that it can fay and externally fit the mounting part, it is possible to enhance the faying performance of the large-diameter attachment part to the mounting part of the outer casing. Still further, because the upset inner periphery portion in the form of a straight hole larger in diameter than the mounting part is provided over the whole circumference of the inner peripheral surface at one end of the large-diameter attachment part opposite to the bellows part, it is possible to allow the large-diameter attachment part to externally fit easily to the mounting part of the outer casing, despite such construction that the large-diameter attachment part can be fayed and externally fitted to the mounting part of the outer casing. In particular, because the upset inner periphery portion is terminated not to extend up to the area in which the fit cylinder part externally fits, it is possible to introduce smoothly the top end of the outer casing from the upset inner periphery portion to the faying inner periphery portion. That is, if the upset inner periphery portion extends up to the external fitting area by the fit cylinder part, the external fitting area will be difficult to extend outwardly owing to the fit cylinder part having a high hardness, and consequently, upon forcing the mounting part into the faying inner periphery portion, an excessive force is abruptly needed and it is difficult to do so. However due to the construction as described above, the failure like this can be dissolved.

In this second joint boot, each of the convex portions may alternatively be formed with a plurality of the first relief holes opening on the one edge face of the large-diameter attachment part and arranged circumferentially, and a plurality of the second relief holes opening on the other edge face and arranged circumferentially, and further provided with the third strut wall supporting the inner wall portion by the wall separating between the first relief holes and the second relief holes and extending circumferentially, as is the case with the first joint boot above. Further the wall thickness of the third strut wall may be preset to be thicker than the wall thickness of the first strut wall separating the mutually adjacent first relief holes, the wall thickness of the second strut wall separating the mutually adjacent second relief holes, the wall thickness of the inner wall portion, and the wall thickness of each peripheral wall of the large-diameter attachment part located between the circumferentially adjacent convex portions.

In the joint boot according to this invention, when an upset part capable of receiving axially the edge surface of the fit cylinder part is formed on the external periphery of the large-diameter attachment part, and the axial length of the upset part is set to be longer than the wall thickness of the fit cylinder part and longer than the wall thickness of the peripheral wall of the large-diameter attachment part located between the circumferentially adjacent convex portions, it is possible to enhance the axial rigidity of the upset part. As a result, it is possible to enhance the assembling capability and increase the productivity. For instance, in the situations where the bellows part and the large-diameter attachment part are assembled with robot hands or manually assembled, such defective assembling that the fit cylinder part might push down and override the upset part can be avoided.

Again in the joint boot of this invention, when the one extremity part of the large-diameter attachment part on the side of the bellows part is constructed in the form of a tapered cylinder whose diameter is smaller toward the bellows part side, in mating the fit cylinder part and the large-diameter attachment part together, it is possible to guide the fit cylinder part by the aforesaid one extremity part in the tapered cylinder form, thus facilitating the mating of both and hence, it is possible to enhance the assembling capability more.

In the joint boot of this invention, when the hardness of the large-diameter attachment part is set at 55 to 85 degrees in terms of JIS A hardness and the hardness of the bellows part, 40 to 50 degrees in terms of JIS D hardness (according to JISK 6253), the following operation is achieved: That is, there arise the problems that when the hardness of the large-diameter attachment part is less than 55 degrees in terms of JIS A hardness, the large-diameter attachment part is too soft to aggravate the sealing capability as indicated in Table 1 whereas when the hardness exceeds 85 degrees, it is too hard to reduce the clamping capability. However, the hardness of the large-diameter attachment part is set at 55 to 85 degrees in terms of JIS A hardness, whereby these problems can be overcome. The present inventors have corroborated the aforesaid characteristics of the large-diameter attachment part by the following experiments: Five test pieces of the large-diameter attachment parts were fabricated from resin materials of 40, 55, 70, 85 and 90 degrees, respectively, in terms of JIS A hardness, and attached respectively to five pieces of the bellows parts. Each of the large-diameter attachment parts was mounted on the outer casing of a tripod type constant velocity joint, the small-diameter attachment part was mounted on the shaft, and grease was hermetically filled in the joint boot (see FIG. 7 regarding the assembling structure; the details of the structures of respective elements will be later described). In that assembled state, the operation of causing the outer casing and the shaft to make a relative movement (slide movement)

in the axial direction, the operation of bending the outer casing and the shaft up to the condition that they make a maximum angle, and the operation of rotating the shaft about the axis center were repeated many times in various optional combinations. Thereafter the leakage of the grease out of between the large-diameter attachment part and the outer casing was observed, and yielded the results that as indicated in Table 1, the leakage of grease was seen (X mark in Table 1) in the large-diameter attachment part of 40 degrees in JIS A hardness, but there were no leakage of grease (O mark in Table 1) with the other large-diameter attachment parts of other hardnesses (55, 70, 85, 90 degrees). Further when each piece of the large-diameter attachment parts was mounted on the outer casing, and the fit cylinder part extended at one extremity of the bellows part was externally mounted on the large-diameter attachment part followed by tightening with a clamping band by the human force, the large-diameter attachment part of 90 degrees in JIS A hardness necessitated a large clamping force (X mark in Table 1), but the other large-diameter attachment parts of the other hardnesses (40, 55, 70, 85 degrees) did not necessitate large clamping force (O mark in Table 1).

TABLE 1

|  | JIS A Hardness | | | | |
| --- | --- | --- | --- | --- | --- |
|  | 40 | 55 | 70 | 85 | 90 |
| Clamping Capability of Large-diameter Attachment Part | O | O | O | O | X |
| Sealing Capability of Large-diameter Attachment Part | X | O | O | O | O |

Notes:
O: good,
X: bad

Further problems are that when the hardness of the bellows part is less than 40 degrees in terms of JIS D hardness, the rigidity is decreased and the bellows part is liable to be deformed, for example, by an impulsive force whereas when the hardness exceeds 50 degrees it becomes too hard, so that the durability is diminished. However, by setting the hardness of the bellows part in the range of 40 to 50 degrees in terms of JIS D hardness, these problems can be eliminated.

Effects Of The Invention

In accordance with the first joint boot of this invention, it is possible to mold the large-diameter attachment part with good precision in a desired configuration and hence, for example when the large-diameter attachment part is tightened and fixed to the outer casing by means of a clamping band, it is possible to prevent a clearance from being created between the recessed portions of the outer casing and the convex portions of the large-diameter attachment part. Moreover while ensuring the moldability, it is possible to reduce the variation in clamping force to enhance the sealing performance.

According to the second joint boot of this invention, it is possible to enhance the faying performance (tight mating) of the large-diameter attachment part to the mounting part of the outer casing and to improve the sealing performance at the large-diameter attachment part. Besides, the large-diameter attachment part is installed with ease externally on the mounting part of the outer casing.

BEST MODE FOR CARRYING OUT THE INVENTION

The best mode for carrying the invention into effect will be hereinafter described with reference to the accompanying drawings. FIGS. 1A to 3 show a joint boot to be installed on a tripod type constant velocity joint of a motor vehicle.

Figure 7:
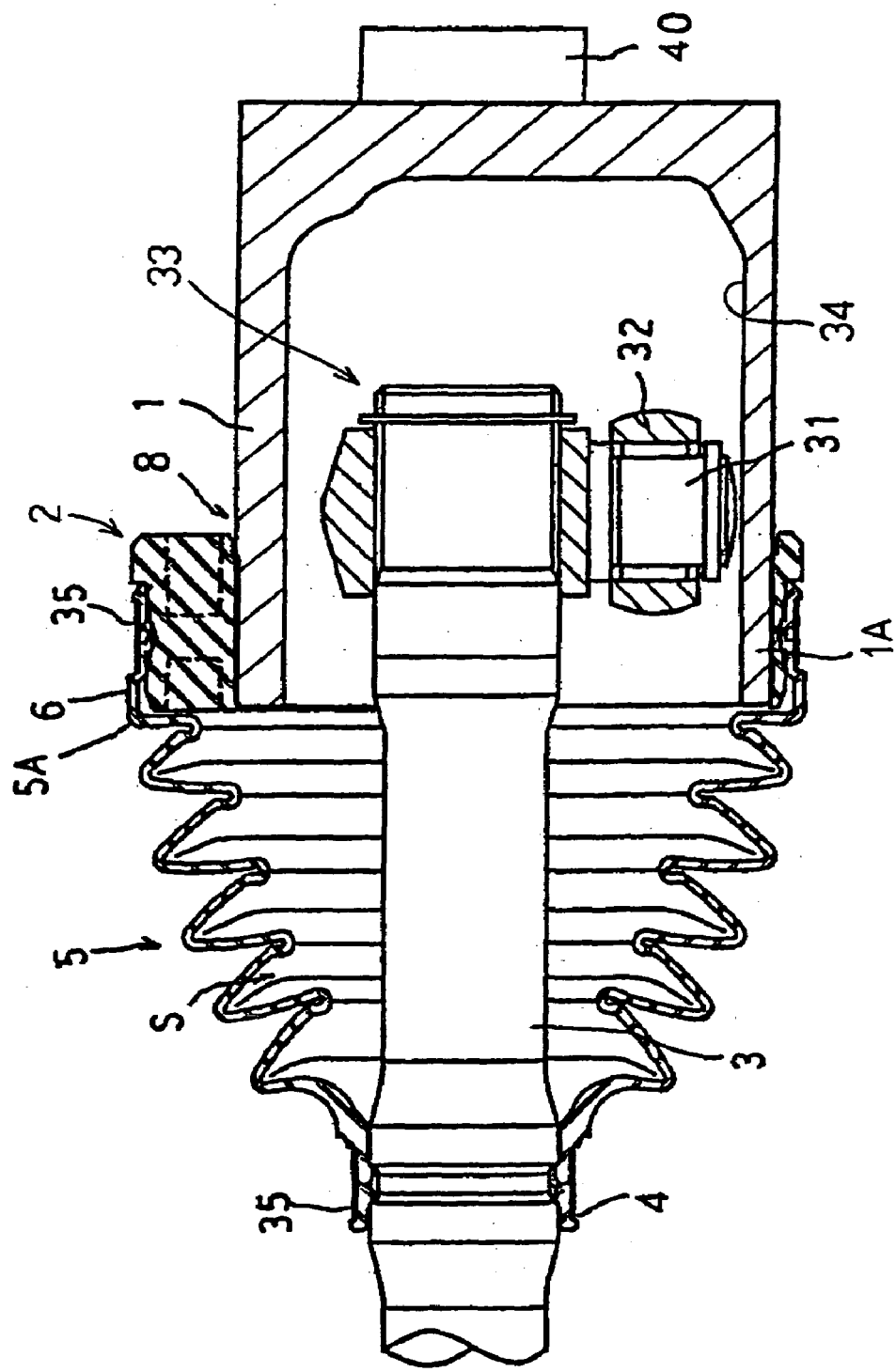
[FIG. 7] is a sectional view showing the state that the joint boot is assembled on the constant velocity joint.
Figure 8:
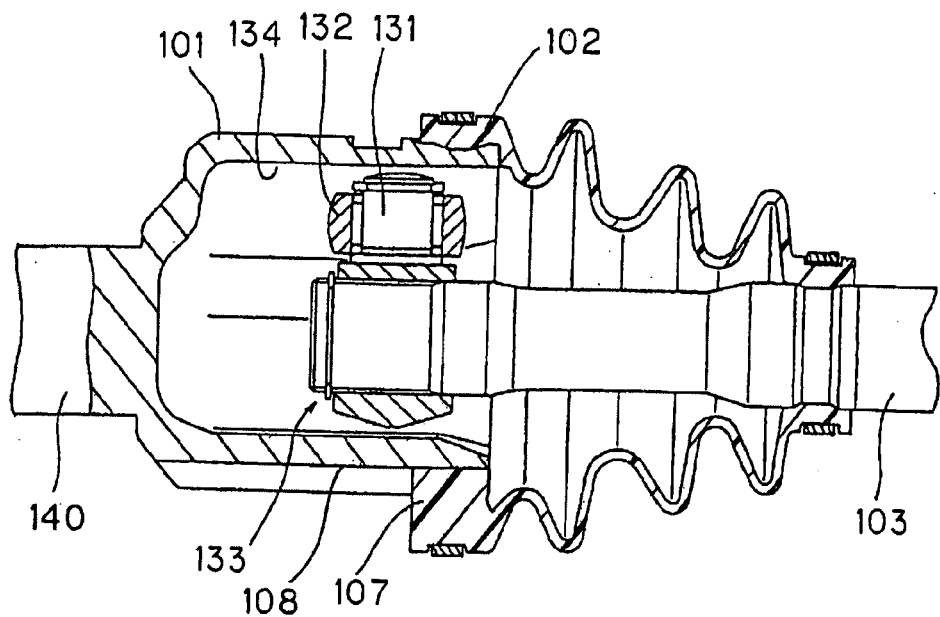
[FIG. 8] is a sectional view showing the state that a conventional joint boot is assembled to a constant velocity joint.
Figure 9:
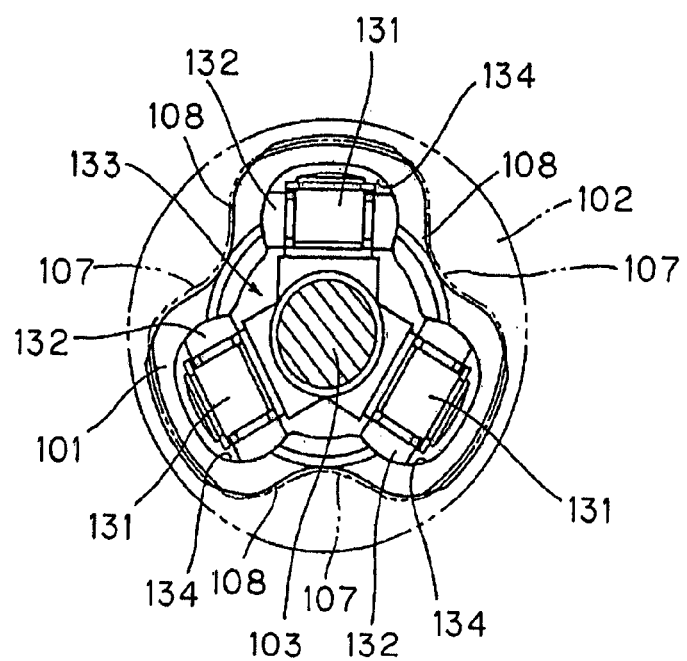
[FIG. 9] is a side view of the constant velocity joint in the previous figure.

The above-mentioned constant velocity joint is made up of, as illustrated in FIG. 7, three trunnions 31 with rollers disposed to an input side shaft 3 so as to protrude in the vertical direction to the axis, and an outer casing 1 disposed to an end of an output side shaft 40, the outer casing 1 being defined on its internal periphery with three grooves 34 on which the rollers 32 roll so that they are disposed in the circumferential direction in a distributed manner. The reference numeral 33 stands for a tripod.

A joint boot is comprised of a cylindrical large-diameter attachment part 2 to be installed so as to be externally fitted on a mounting part 1A of the outer casing 1, a cylindrical small-diameter attachment part 4 to be attached to the shaft 3, and a bellows part 5 linking both, wherein the large-diameter attachment part 2 and the bellows part 5 are formed in separate bodies, and a fit cylinder part 6 externally fitting and fixing to the large-diameter attachment part 2 is extended at one extremity 5A of the bellows part 5. The large-diameter attachment part 2 and the small-diameter attachment part 4 are concentrically disposed and accordingly, the small-diameter attachment part 4 and the fit cylinder part 6 are also concentrically disposed. On the external peripheries of the small-diameter attachment part 4 and the fit cylinder part 6, there are formed annular grooves 9, 19, respectively, on which clamping bands 35 are wrapped around. The bellows part 5 is configured in a taper form that is smaller in diameter toward the small-diameter attachment part 4, and its hollow part defines a space S for filling therein a grease.

The small-diameter attachment part 4, the bellows part 5 and the fit cylinder part 6 are formed integrally of a thermoplastic elastomer resin material, while the large-diameter attachment part 2 is formed of a softer resin material than the bellows part 5. For example, it is possible to preset the hardness of the large-diameter attachment part 2 to be 55 to 85 degrees in JIS A hardness and the hardness of the bellows part 5 to be 40 to 50 degrees in JIS D hardness (according to JIS K 6253). For a resin material constituting the large-diameter attachment part 2 there may be mentioned TPO (thermoplastic olefin), for example, "Santoprene" (commercial name) manufactured by AES (Advanced Elastomer Systems Co.). For a resin material constituting the bellows part 5 and the small-diameter attachment part 4 there may be mentioned, for example, TPEE, TPO, etc.

The large-diameter attachment part 2 is configured, on its outer peripheral surface 2A, in a circular shape in cross-section and provided on its inner periphery with three convex portions 7 projecting radially inwardly distributed equally at every 120 degrees in the circumferential direction, and constructed so that the three convex portions 7 can be externally fitted in three recessed portions 8 formed on the outer periphery of the mounting part 1A of the outer casing 1. On the other hand, the fit cylinder part 6 is configured on both inner and outer peripheral surfaces in a short cylinder shape assuming a circular form in cross-sectional and is externally fitted on the outer periphery of the large-diameter attachment part 2. On the inner periphery of the fit cylinder part 6, an annular projecting portion 51 is provided and on the outer periphery of the large-diameter attachment part 2, there is provided a shallow annular groove 52, in which the annular projecting portion 51 is received and mated.

The convex portions 7 of the large-diameter attachment part 2 are each configured in a gently-sloping chevron form in transversal cross-section. The convex portion 7 is disposed in a symmetric form as viewed in the axial direction of the large-diameter attachment part 2 relative to a circumferentially central line L thereof, and smoothly merges into each arc-like peripheral wall 15 between the mutually adjacent convex portions 7. The center lines L of the three convex portions 7 are located in a radial fashion relative to the axis center O and at every 120 degrees in the circumferential direction.

At the large-diameter attachment part 2, a faying inner periphery portion 50 of a smaller diameter than the mounting part 1A of the outer casing 1 is disposed over a whole circumference of the inner peripheral surface of it. That is, the faying inner periphery portion 50 is set to have a smaller profile of its inner peripheral surface than the profile of the outer peripheral surface of the mounting part 1A. More specifically, on the inner periphery of the large-diameter attachment part 2, the convex portions 7 fitting and mating in the recessed portions 8 of the mounting part 1A are disposed in a distributed manner as described above, so that the radii vary in the circumferential direction. Therefore, the radii of the inner peripheral surface of the faying inner periphery portion 50 are set to be smaller than the radii of corresponding places to the mounting part 1A in the whole circumferential direction. For example, as illustrated in FIG. 6B, the radius D2 at the convex portions 7 is set to be smaller than the radius D0 of the mounting part 1A at the recessed portions 8. Thereby the large-diameter attachment part 2 is constructed to be capable of faying and externally fitting the mounting part 1A.

At the one end 70 of the large-diameter attachment part 2 opposite to the bellows part 5, there is provided, over the whole circumference of the inner peripheral surface, an upset inner periphery portion 71 assuming a straight hole of a larger diameter than the mounting part 1A and guiding the mounting part 1A when externally fitting the large-diameter attachment part 2 into the mounting part 1A. The upset inner periphery portion 71 is set to be larger in profile of its inner peripheral surface than the outer peripheral surface of the mounting part 1A, namely, the radius on the inner peripheral surface of the upset inner peripheral area 71 is larger in the whole circumferential direction thereof than the radius at corresponding places of the mounting part 1A. For example, the radius D1 at the convex portions 7 is set to be larger than the radius D0 at the recessed portions 8 of the mounting part 1A as illustrated in FIG. 6B. The upset inner periphery portion 71 is terminated so as not to reach the external fitting area by the fit cylinder part 6 in the axial direction of the large-diameter attachment part 2. That is to say, the upset inner periphery portion 71 is provided within the range of an axial length X of an upset part 39, which will be later described, from the one edge face 7A of the large-diameter attachment part 2 and more specifically, formed in a shorter axial dimension than the upset part 39. The boundary 72 between the upset inner periphery portion 71 and the faying inner periphery portion 50 defines a tapered hole. Likewise the boundary 73 between the upset inner periphery portion 71 and the one edge face 7A of the large-diameter attachment part 2 defines a tapered hole.

Figure 1:
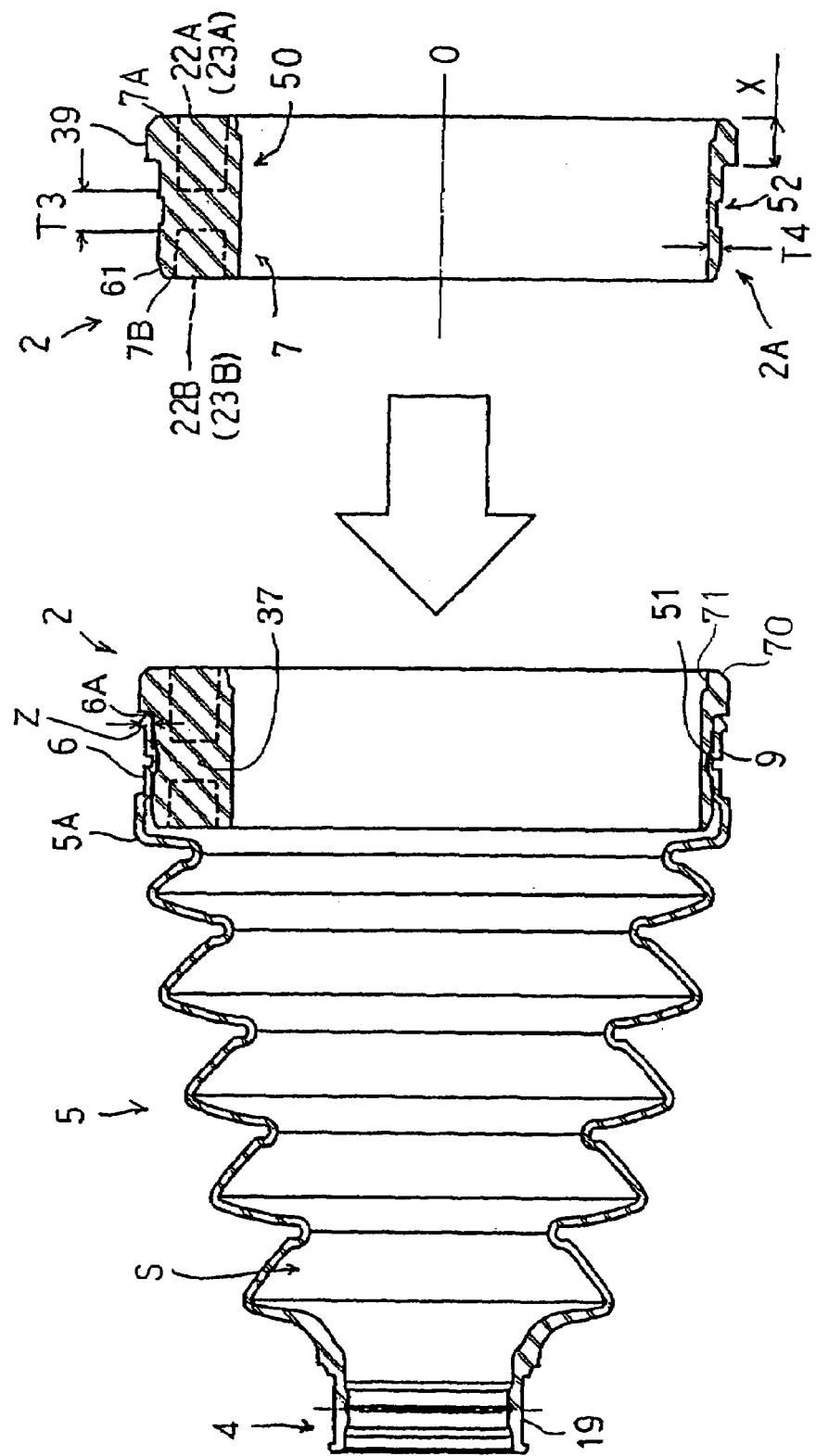
[FIG. 1A] is a longitudinal sectional view of a joint boot pertaining to one embodiment of this invention with attached bellows portion.
[FIG. 1B] is a longitudinal sectional view of a joint boot pertaining to one embodiment of this invention.
Figure 2:
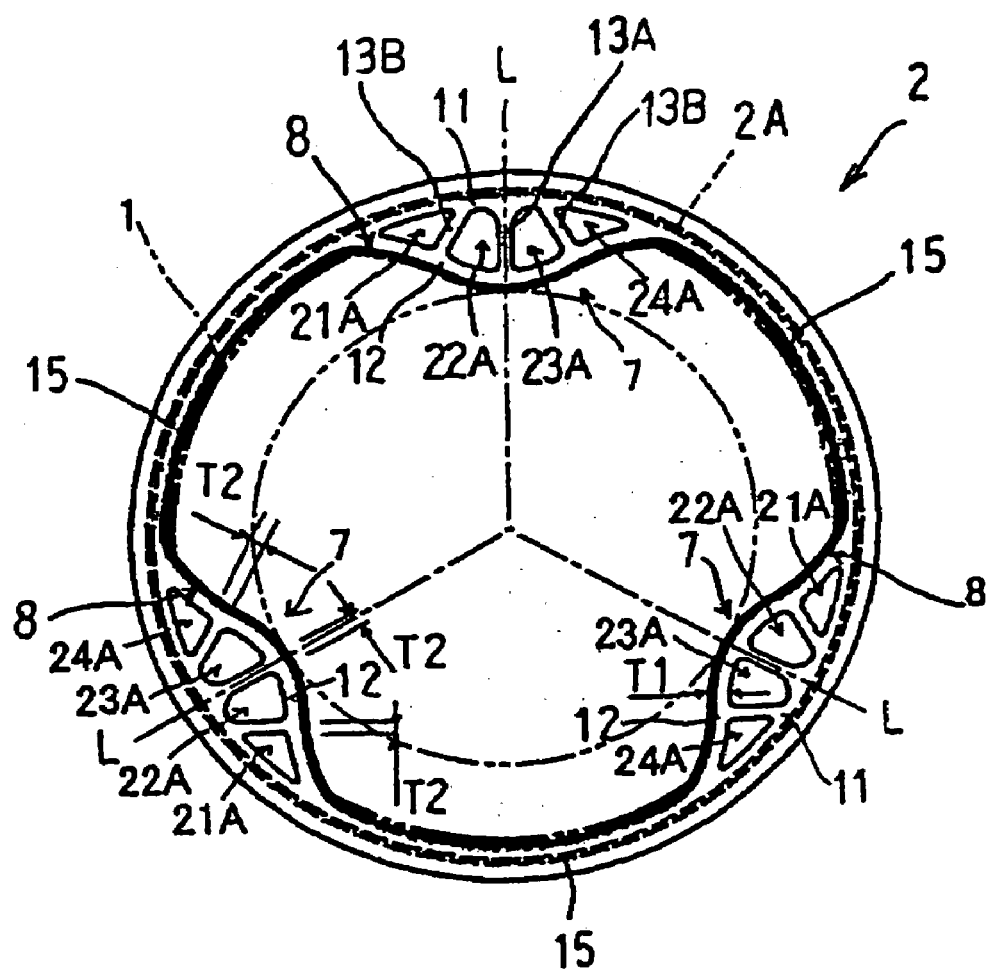
[FIG 2] is an illustration of one edge face of a large-diameter attachment part of the joint boot when viewed from outside thereof.
Figure 3:
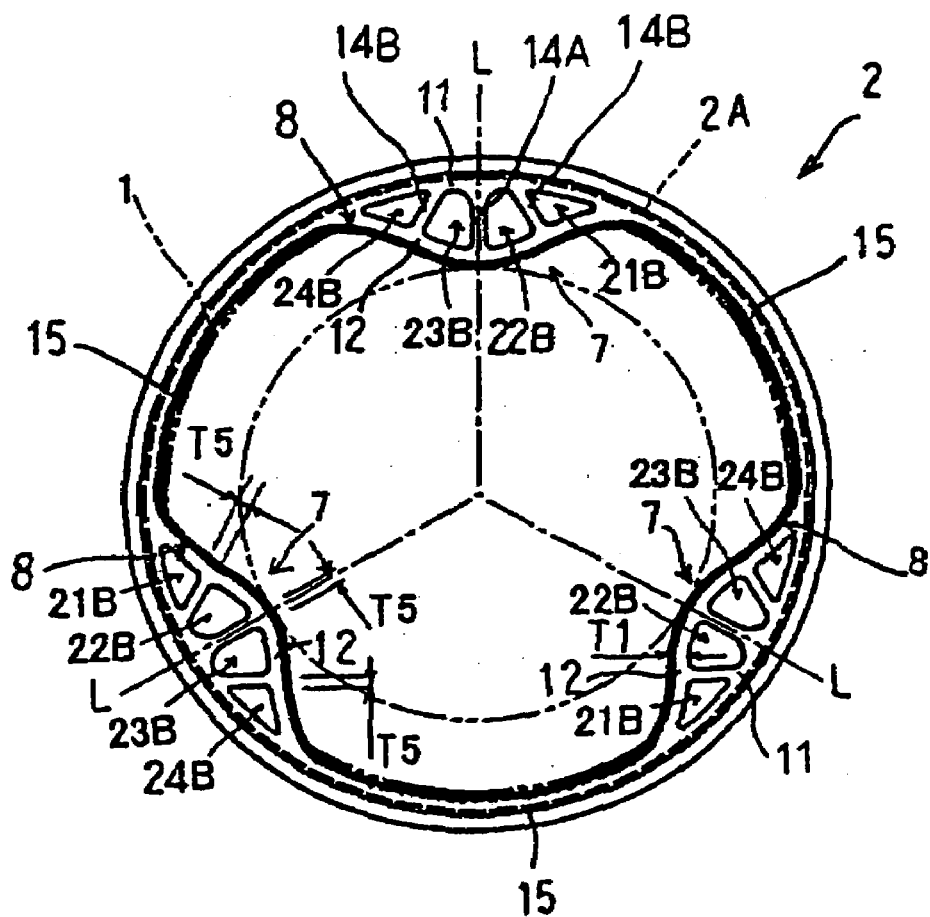
[FIG. 3] is an illustration of the other edge face of the large-diameter attachment part when viewed from outside thereof.

As shown in FIGS. 2 and 3, each of the convex portions 7 is made up of an inner wall portion 12 jutting radially inwardly and adapted to be fitted in the recessed portion 8 and an outer wall portion 11 of an arc form constituting part of an outer peripheral surface 2A of the large-diameter attachment part 2. In a cavity part between the inner wall portion 12 and the outer wall portion 11, central strut walls 13A, 14A interlinking both wall portions 12, 11 and pairs of lateral strut walls 13B, 13B; 14B, 14B linking both wall portions 12, 11 at both sides of them are provided.

By this construction, four relief holes subsiding axially are juxtaposed on each of the convex portions 7 in the circumferential direction. More specifically, the relief holes are apertured on the one edge face 7A of the large-diameter attachment part 2, and include two pairs of first relief holes (bottomed holes) 21A, 22A, 23A, 24A (cf. FIG. 2) symmetric relative to the center line L and two pairs of second relief holes (bottomed holes) 21B, 22B, 23B, 24B (cf. FIG. 3) symmetric relative to the center line L. Accordingly, the foregoing strut walls are constructed of first strut walls comparting the first relief holes (the central strut wall 13A and the lateral strut walls 13B, 13B) and second strut walls comparting the second relief holes (the central strut wall 14A and the lateral strut walls 14B, 14B). Further, there is formed a third strut wall 37 (cf. FIG. 1A) extending circumferentially to support the inner wall portion 12 by the wall part dividing between the first relief holes and the second relief holes, namely, the first relief holes and the second relief holes are situated on both sides interposing the strut wall 37 in the axial middle of the large-diameter attachment part 2. The depths of the four first relief holes 21A, 22A, 23A, 224A are the same. The depths of the four second relief holes 21B, 22B, 23B, 24B are also the same and somewhat shallower than the four first relief holes 21A, 22A, 23A, 24A.

Figure 4:
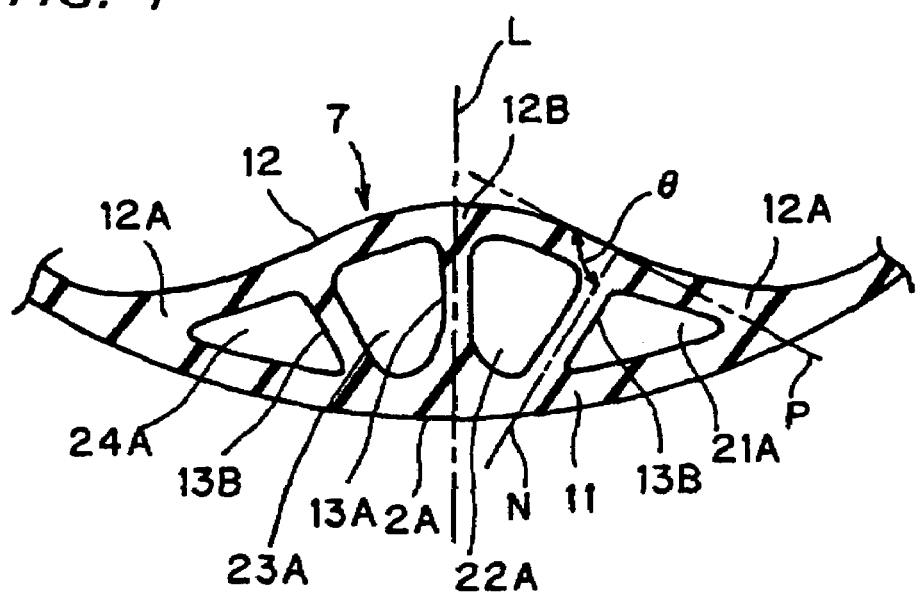
[FIG. 4] is an enlarged sectional view of the convex portion on the one edge side of the large-diameter attachment part.

As shown in FIG. 4, the first central strut wall 13A is a radially extending wall for supporting the inner wall portion 12 to the outer wall portion 11 and provided in the middle of it relative to the circumferential direction where the inner wall portion 12 inwardly juts most largely. The first lateral strut wall 13B supports the inner wall portion 12 to the outer wall portion 11 and is provided obliquely to the central strut wall 13A which is situated in a radial fashion from the axis center O of the large-diameter attachment part 12, not in parallel. More specifically, the lateral strut wall 13B supports the inner wall portion 12 in the intermediate position of the inner wall portion 12 between a root area 12A to the outer wall portion 11 and a linking area 12B to the central strut wall so that the inner wall portion 12 may be supported by the central strut wall 13A and the lateral strut walls 13B, 13B at equal intervals in the circumferential direction, namely, the lateral strut wall is connected to the inner wall portion 12 in the aforesaid intermediate position. Further in order that the lateral strut wall may intersect the inner wall portion 12 nearly vertically in the linking area, the lateral strut wall is provided in a manner being closer to the center as it extends outwards of the linking area, namely, slanting so as to approach the central strut wall 13A. Here, the connecting angle θ of the lateral strut wall 13B to the inner wall portion 12 is preferred to be nearly vertical, and more specifically, the connecting angle θ is preferably in the range of 70 to 110 degrees (i.e., 90±20 degrees), more preferably in the range of 80 to 100 degrees. This connecting angle θ is an angle at which a center line N of the lateral strut wall 13B and a tangential line P on the inner peripheral surface of the inner wall portion 12 intersecting the center line L make. A wall thickness T2 of these first strut walls 13A and 13B is substantially constant over the whole length.

Due to the fact that the first strut walls 13A, 13B are provided in this manner, a pair of the first relief holes 22A, 23A located inwards and close to the center line L assume a trapezoid shape, with their outer peripheral surface 2A sides being narrower and are larger in size than a pair of the first relief holes 21A, 24A remote from the center line L and located outwards, and the whole peripheral face (except for the bottom face) is parallel to the axis center O. The outside repair of the first relief holes 21A, 24A are of a triangular form and the whole inner peripheral face (except for the bottom face) is parallel to the axis center O.

Figure 5:
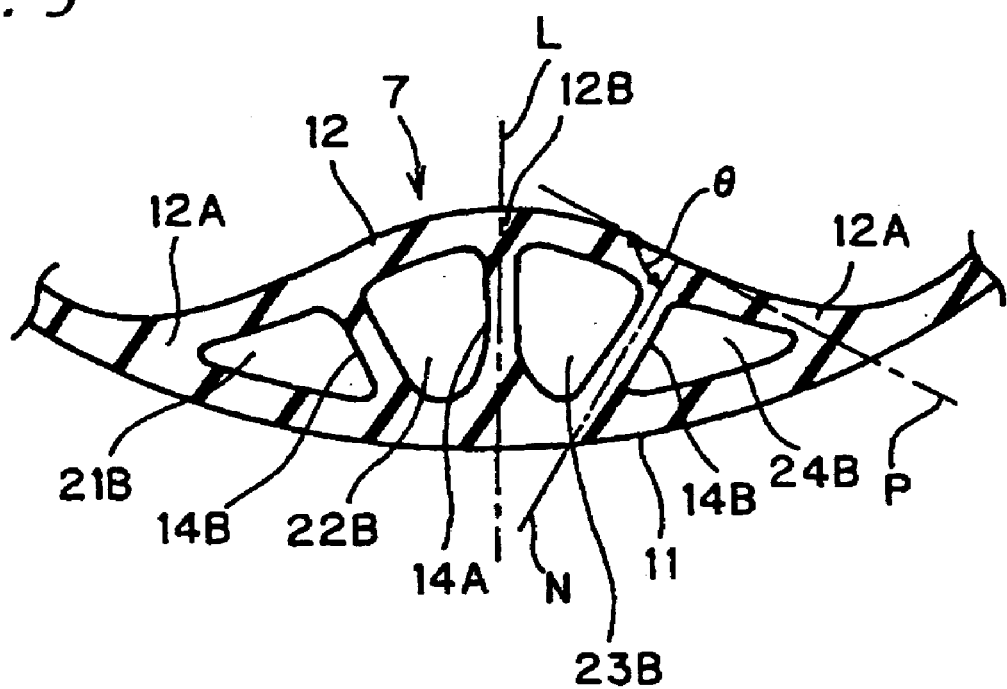
[FIG. 5] is an enlarged sectional view of the convex portion on the other edge side of the large-diameter attachment part.

As shown in FIG. 5, the structures of the second central strut wall 14A and the lateral strut walls 14B, 14B are the same as those of the first central strut wall 13A and the lateral strut walls 13B, 13B. Consequently, the structures of the second relief holes 21B, 22B, 23B, 24B are the same as those of the first relief holes 21A, 22A, 23A, 24A, thus being identical in position and shape. Stated another way, when the large-diameter attachment part 2 is axially viewed, the first relief hole 21A and the second relief hole 21B are of an identical shape and congruent with each other, the first relief hole 22A and the second relief hole 22B are identical in shape and congruent with each other; the first relief hole 23A and the second relief hole 23B are identical in shape and congruent with each other; the first relief hole 24A and the second relief hole 24B are identical in shape and congruent with each other.

Moreover, the wall thickness T2 of the first strut walls 13A, 13B, a wall thickness T5 of the second strut walls 14A, 14B, and a wall thickness T1 of the inner wall portion 12 of the convex portion 7 are set to be the same or nearly the same. Thereby it is possible to make it difficult that a significant difference is made among a cooling speed of the resin material corresponding to the first strut walls 13A, 13B, a cooling speed of the resin material corresponding to the second strut walls 14A, 14B, and a cooling speed of the resin material corresponding to the inner wall portions 12. As a result, it is possible to prevent the occurrence of strain at the convex portions 7 which is caused by different cooling speeds of these resin materials, whereby it is possible to facilitate molding the large-diameter attachment part 2 in a desired configuration with good precision and to enhance the faying capability of the large-diameter attachment part 2 to the outer casing 1.

Again in this embodiment, a wall thickness T4 of the peripheral walls 15 (the wall thickness of the peripheral wall portion not formed with the annular groove 52; cf. FIG. 1A) of the large-diameter attachment part 2 located between circumferentially adjacent convex portions 7 is set to be the same or nearly the same as the wall thicknesses T1, T2 and T5 above. Thereby it is also possible to make it difficult that the cooling speed of resin material corresponding to the peripheral wall 15 is significantly differentiated from the aforesaid cooling speeds of resin materials corresponding to the first strut walls 13A, 13B, the second strut walls 14A, 14B, and the inner wall portion 12. As a consequence, it is possible to facilitate molding more precisely the large-diameter attachment part 2 in a desired configuration, thus to further enhance the sealing performance.

On the other hand, with respect to the third strut wall 37, a wall thickness T3 (thickness is constant) thereof in the axial direction is set to be thicker than these wall thicknesses T1, T2, T4 and T5, being twice the thicknesses T1, T2, T4 and T5. Thereby it is possible to transmit securely the clamping force by the clamping band 35 to the inner wall portions 12.

As illustrated in FIG. 1A, on an external peripheral area of the large-diameter attachment part 2 there is formed an upset part 39 capable of receiving and stopping axially an edge face 6A of the fit cylinder part 6. An axial length X of the upset part 38 is set to be longer than a wall thickness Z of the fit cylinder part 6 so that the fit cylinder part 6 may not push down the upset part 39 as it is fitted on the large-diameter attachment part 2, thus enhancing the rigidity of the upset part 39 in the axial direction. The length X of the upset part 39 is set to be longer than the wall thickness T4 of the peripheral wall portions 15, so that the rigidity is further enhanced. In general, when injection molding the large-diameter attachment part 2, the length of the upset part 39 is set in a dimension of the same order as the wall thickness of the adjacent peripheral wall, taking account of the flow of the resin within the cavity. However, this embodiment is characterized in that the length X of the upset part 39 is made larger than the wall thickness T4 of the peripheral walls 15 to enhance the rigidity. The length X of the upset part 39 is such that the fit cylinder part 6 never pushes down the upset part 39, and is preferred to be 2 to 5 times the wall thickness Z of the fit cylinder part 6. For example, the length X can be set in 1.5 mm to 5 mm. Thereby it is possible to facilitate enhancing the rigidity of the upset part 39 in the axial direction while suppressing any increase in fabrication cost. That is, if the length X of the upset part 39 is smaller than the foregoing range, then the rigidity will be deteriorated whereas if it exceeds the foregoing range, much amount of material will be needed, raising the fabrication cost. By the wall thickness Z of the fit cylinder part 6 is meant a maximum thickness of a portion on the extremity side (the right hand in the drawing) from the annular groove 9 on which the clamping band 35 is wrapped around.

As shown in FIG. 1B, the one end part 61 of the large-diameter attachment part 2 on the side of the bellows part 5 is formed in a tapered cylinder shape, which is smaller in diameter toward the bellows part 5. Thus upon fitting of the fit cylinder part 6 into the large-diameter attachment part 2, it is possible to guide the fit cylinder part 6 by the one end part 61 in the tapered cylinder form, thus to ameliorate the assembling capability of both.

Figure 6:
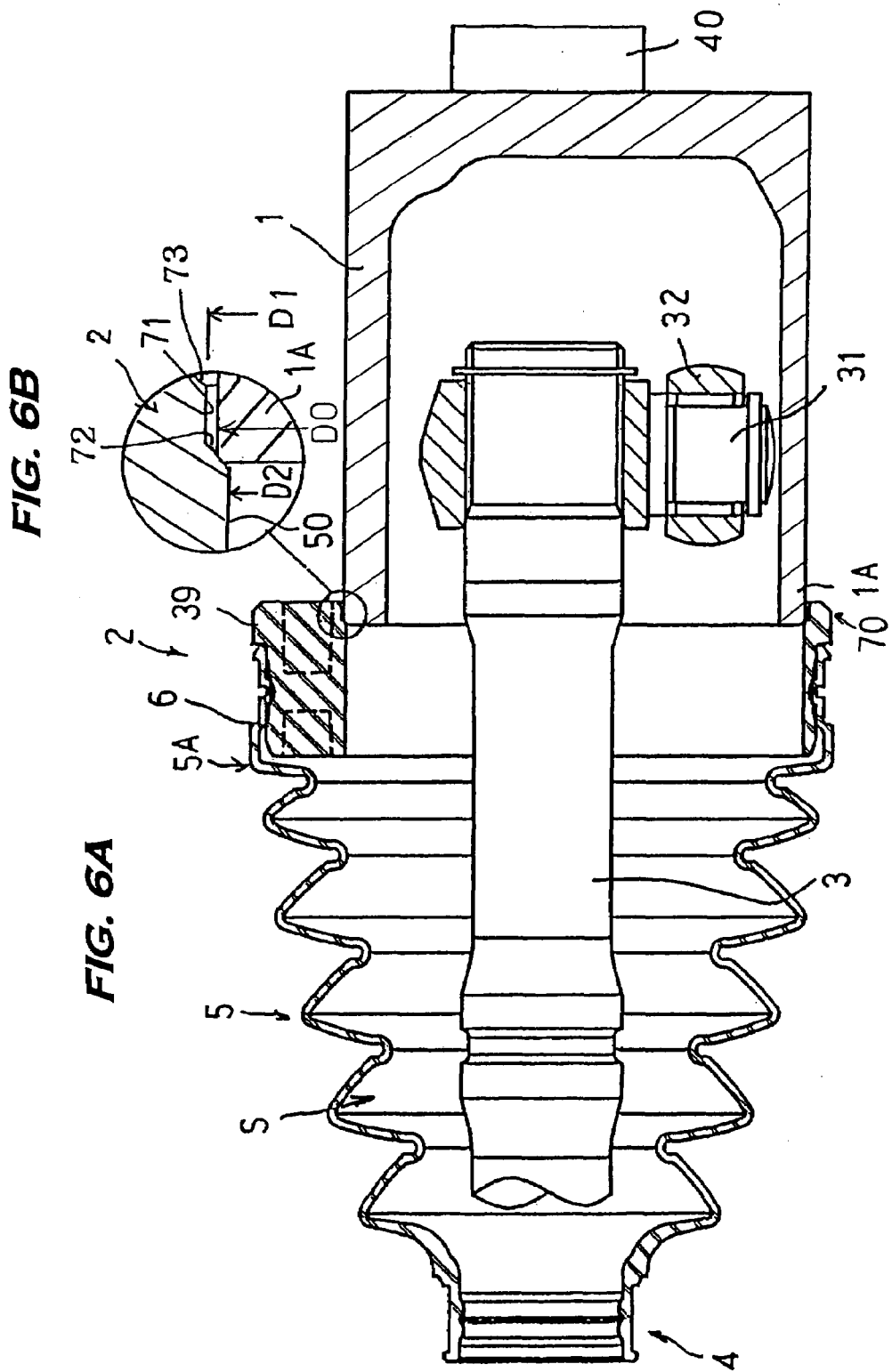
[FIG. 6A] is a sectional view showing a state of the joint boot in the course of assembling it to a constant velocity joint.
[FIG. 6B] is an enlarged sectional view from FIG. 6A showing a connection point between a large-diameter attachment part and a mounting part.

When the joint boot thus constructed is mounted on a constant velocity joint, as illustrated in FIGS. 6 and 7, the fit cylinder part 6 of the bellows part 5 is externally fitted and fixed to the large-diameter attachment part 2, concurrently with which the large-diameter attachment part 2 is externally fitted on the outer casing 1, the small-diameter attachment part 4 is externally fitted to the shaft 3, and the clamping band 35 is tightened on the annular groove 9 of the fit cylinder part 6 and the annular groove 19 of the small-diameter attachment part 4, thereby performing the fixing. In externally fitting the large-diameter attachment part 2 to the outer casing 1, the upset inner periphery portion 71 of the large-diameter attachment part 1 serves to guide the mounting part 1A of the outer casing and hence, it is possible to facilitate external fitting of the large-diameter attachment part 2 to the outer casing. In particular, because the upset inner periphery portion 71 is formed in a range not reaching the externally fitted region by the fit cylinder part 6 having a high hardness, an excessive force is not needed to apply from initially when forming the mounting part 1A guided by the upset inner periphery portion 71 into the faying inner periphery portion 50, and consequently, it is possible to introduce the mounting part smoothly. In a case where the upset inner periphery portion 71 extends up to the externally fitted region by the fit cylinder part 6, that region is so difficult to be expanded outwardly owing to the hard fit cylinder part 6 that an excessive force is required from initially when forcing the mounting part 1A into the faying inner periphery portion 50. However, this is not the case with the embodiment described above and such defect is eliminated.

Further because the inner wall portion 12 of the convex position 7 is supported by three strut walls, namely the central support struts 13A; 14A in the circumferential middle thereof and the lateral support struts 13B, 13B; 14B, 14B on both sides, it is possible to dispose the lateral strut walls 13B, 13B; 14B, 14B, while supporting the central area of the inner wall portion 12 most jutting radially inwardly with the central support struts 13A, 14A so that the clamping force may be equalized to the utmost also on both sides of the central area. Thus a variation in clamping force can be effectively reduced. In that case, a relatively simple structure is enough for the geometry of the mold and further, some degree of cross-sectional area can be ensured for cores for molding the relief holes, so that any deformation by injection pressure can be suppressed.

Moreover by slanting the lateral strut walls 13B, 14B in a manner such that as they outwardly extend, they may approach the central strut walls 13A, 14A, the following effects can be achieved: If the lateral strut walls 13B, 14B are disposed in parallel to the central strut walls 13A, 14A, the relief holes 21A, 24A; 21B, 24B outwards of the lateral strut walls 13B, 14B are smaller in cross-sectional area and demolding of the cores for molding them will be difficult. On the contrary, by slanting them as described above, it is possible to make the cross-sectional area of the outward relief holes 21A, 24A; 21B, 24B larger and to ensure the demolding capability of the cores to enhance the moldability. In addition, the lateral strut walls 13B, 14B supporting the outward surface of the inner wall portion 12 can be connected to the inner wall portion 12 at a nearly vertical angle and hence, it is possible to more equalize the surface pressure of the inner wall portions 12 applied to the outer casing 1 in the circumferential direction and to enhance the sealing performance.

The resin material constituting the large-diameter attachment part 2 may be, for example, TPEE (e.g., "Pelprene" (commercial name) manufactured by Toyo Boseki KK, "Hitrel" (commercial name) by Torey-Du Pont Co.)). The large-diameter attachment part 2 may be made of, for example, CR (chloroprene rubber), NBR (nitrile-butadiene rubber), or other rubber materials. In that case, it is possible to set the hardness of the large-diameter attachment part 2 in the range of 55 to 85 degrees in terms of JIS A hardness.

INDUSTRIAL APPLICABILITY

The joint boot according to this invention can be advantageously utilized mainly for joint boots for use in tripod type constant velocity joints of automobiles.

DESCRIPTION OF REFERENCE CHARACTERS

1 . . . outer casing, 1A . . . attaching part, 2 . . . large-diameter attachment part, 3 . . . shaft, 4 . . . small-diameter attachment part, 5 . . . bellows part, 5A . . . one edge of the bellows part, 6 . . . fit cylinder part, 6A . . . edge surface of the fit cylinder part, 7 . . . convex portion, 7A . . . one edge surface of the large-diameter attachment part, 7B . . . the outer edge surface of the large-diameter attachment part, 8 . . . recessed portion, 11 . . . outer wall portion, 12 . . . inner wall portion, 13A . . . first central strut wall, 13B . . . first lateral strut wall, 14A . . . second central strut wall, 14B . . . second lateral strut wall, 15 . . . peripheral wall, 21A, 22A, 23A, 23A . . . first relief hole, 21B, 22B, 23B, 24B . . . second relief hole, 37 . . . third strut wall, 39 . . . upset part, 50 . . . faying inner cylinder portion, 61 . . . one end of the large-diameter attachment part on the bellows part side, 70 . . . one end of the large-diameter attachment part opposite to the bellows part, 71 . . . upset inner periphery portion, T1 . . . wall thickness of the inner wall portion, T2 . . . wall thickness of the first strut wall, T3 . . . wall thickness of the third strut wall, T4 . . . wall thickness of the periphery wall, T5 . . . wall thickness of the second strut wall, X . . . axial length of the upset part, Z . . . wall thickness of the fit cylinder part

The invention claimed is:

1. A joint boot comprising a cylindrical large-diameter attachment part to be installed by external fitting to a mounting part of an outer casing, a small-diameter attachment part to be installed on a shaft, and a bellows part linking both, the large-diameter attachment part assuming on its outer peripheral surface a circular form in cross-section and being in its inner periphery area provided with a plurality of convex portions protruding radially inwardly so as to be distributed in the circumferential direction, the plural convex portions being constructed so that they can be externally fitted respectively in a plurality of recessed portions formed on the mounting part of the outer casing, wherein the large-diameter attachment part is formed in a separate body from the bellows part, and a fit cylinder part externally fitting on the large-diameter attachment part is extended at one extremity of the bellows part;

each of the convex portions of the large-diameter attachment part comprises an inner wall portion radially inwardly jutting in a curved form and adapted to fit in each of the said recessed portions, an outer wall portion of an arc form constituting part of the outer peripheral surface of the large-diameter attachment part, a central strut wall connecting the inner wall portion and the outer wall portion in the circumferential middles of both and extending radially, and a pair of lateral strut walls linking the inner wall portion and the outer wall portion on both sides of the central strut wall, whereby four relief holes are provided on the convex portion so as to be juxtaposed in the circumferential direction; and which is characterized in that said relief holes include four first relief holes apertured on one edge face side of the large-diameter attachment part and juxtaposed in the circumferential direction, and four second relief holes apertured on the other edge face side and juxtaposed in the circumferential direction; there is provided a third strut wall supporting each of the inner wall portions by a partition wall dividing between the first relief holes and the second relief holes and extending in the circumferential direction.

2. The joint boot as set forth in claim 1, wherein a wall thickness of the third strut wall is set to be larger than a wall thickness of the first central strut wall comparting mutually the first relief holes and the lateral strut walls, a wall thickness of the second central strut wall comparting mutually the second relief holes, and a wall thickness of the inner wall portion.

3. A joint boot comprising a cylindrical large-diameter attachment part to be installed by external fitting to a mounting part of an outer casing, a small-diameter attachment part to be installed on a shaft, and a bellows part linking both, the large-diameter attachment part assuming on its outer peripheral surface a circular form in cross-section and being in its inner periphery area provided with a plurality of convex portions protruding radially inwardly so as to be distributed in the circumferential direction, the plural convex portions being constructed so that they can be externally fitted respectively in a plurality of recessed portions formed on the mounting part of the outer casing, wherein the large-diameter attachment part is formed in a separate body from the bellows part, and a fit cylinder part externally fitting on the large-diameter attachment part is extended at one extremity of the bellows part;

each of the convex portions of the large-diameter attachment part comprises an inner wall portion radially inwardly jutting in a curved form and adapted to fit in each of the said recessed portions, an outer wall portion of an arc form constituting part of the outer peripheral surface of the large-diameter attachment part, a central strut wall connecting the inner wall portion and the outer wall portion in the circumferential middles of both and extending radially, and a pair of lateral strut walls linking the inner wall portion and the outer wall portion on both sides of the central strut wall, whereby four relief holes are provided on the convex portion so as to be juxtaposed in the circumferential direction; and which is characterized in that the bellows part is formed of a resin material and the large-diameter attachment part is formed in a separate body from the bellows part and of a softer resin material than the bellows part or rubber material;

the large-diameter attachment part is provided, over the entirety of its inner peripheral surface, with a faying inner periphery portion smaller in diameter than the mounting part of the outer casing so that the large-diameter attachment part can be externally fitted and fayed on the mounting part; and one end of the large-diameter attachment part opposite to the bellows part is provided, over the entirety of its inner peripheral surface, with an upset inner periphery portion assuming a straight hole of a larger diameter than the mounting part and guiding the mounting part when externally fitting the large-diameter attachment part on the mounting part, the upset inner periphery portion being terminated not to extend in the axial direction of the large-diameter attachment part up to an external fitting area by the fit cylinder part.

4. A joint boot comprising a cylindrical large-diameter attachment part to be installed by external fitting to a mounting part of an outer casing, a small-diameter attachment part to be installed to a shaft, and a bellows part linking both, the large-diameter attachment part assuming, on its outer peripheral surface, a circular form in cross-section and being on its inner periphery area provided with a plurality of convex portions protruding radially inwardly so as to be distributed in the circumferential direction, a plurality of the convex portions being constructed so that they can be externally fitted respectively in a plurality of recessed portions formed on the mounting part of the outer casing.

wherein the bellows part is formed of resin material and the large-diameter attachment part is formed in a discrete body from the bellows part and of a softer resin material than the bellows part or rubber material;

a fit cylinder part externally fitting on the large-diameter attachment part is extended at one extremity of the bellows part;

the large-diameter attachment part is provided over the entirety of its inner periphery surface with a faying inner periphery portion smaller in diameter than the mounting part of the outer casing so that the large-diameter attachment part can be fayed and externally fitted to the mounting part; and the one end of the large-diameter attachment part opposite to the bellows part is provided over the entirety of the inner periphery surface with an upset inner periphery portion assuming a straight hole larger in diameter than the mounting part and guiding the mounting part when externally fitting the large-diameter attachment part on the mounting part, the upset inner periphery portion being terminated not to extend in the axial direction of the large-diameter attachment part up to an external fitting area by the fit cylinder part.

5. The joint boot as set forth in claim 4, wherein an outer periphery area of the large-diameter attachment part is formed with an upset part capable of axially receiving an edge surface of the fit cylinder part, and the upset part is set to be longer in axial length than a wall thickness of the fit cylinder part and a wall thickness of peripheral walls located between the circumferentially adjacent convex portions of the large-diameter attachment part.

6. The joint boot as set forth in claim 5, wherein the one end of the large-diameter attachment part on the side of the bellows part is constructed in a tapered cylindrical form that is smaller in diameter toward the bellows part side.

7. A joint boot as set forth in claim 4, which is characterized in that on the convex portions there are formed a plurality of first relief holes opening on one edge side of the large-diameter attachment part and juxtaposed in the circumferential direction and a plurality of second relief holes opening on the other edge side and juxtaposed circumferentially;

and there is provided a third strut wall that supports the inner wall portion by a partition wall dividing between the first relief holes and the second relief holes and extends circumferentially.

8. The joint boot as set forth in claim 7, wherein a wall thickness of the third strut wall is set to be larger than a wall thickness of the first central strut wall comparting mutually the first relief holes and the lateral strut walls, a wall thickness of the second central strut wall comparting mutually the second relief holes, and a wall thickness of the inner wall portion.

\* \* \* \* \*